(12) United States Patent
Schlumberger (10) Patent No.: US 7,289,291 B1
(45) Date of Patent: Oct. 30, 2007

(54) DISK DRIVES AND METHODS ALLOWING FOR SUPER SILENT SEEKS

(75) Inventor: Maurice Schlumberger, Menlo Park, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/196,061

(22) Filed: Aug. 3, 2005

Related U.S. Application Data (60) Provisional application No. 60/649,840, filed on Feb. 3, 2005.

(51) Int. Cl.
G11B 5/596 (2006.01)
G11B 33/14 (2006.01)
G11B 19/02 (2006.01)

(52) U.S. Cl. ............... 360/78.06; 360/78.04; 360/97.02

(58) Field of Classification Search ............ None
See application file for complete search history.

(56) References Cited

U.S. PATENT DOCUMENTS

| | | | |
|---|---|---|---|
| 4,937,689 A | | 6/1990 | Seaver et al. |
| 5,901,009 A | * | 5/1999 | Sri-Jayantha et al. .... 360/78.07 |
| 5,982,570 A | * | 11/1999 | Koizumi et al. ............ 360/69 |
| 6,256,163 B1 | | 7/2001 | Schmidt et al. |
| 6,396,653 B1 | | 5/2002 | Haines et al. |
| 6,445,531 B1 | | 9/2002 | Gaertner et al. |
| 6,560,059 B1 | * | 5/2003 | Hsin et al. ................ 360/78.04 |
| 6,624,964 B1 | | 9/2003 | Pirzadeh |
| 6,757,481 B1 | * | 6/2004 | Nazarian et al. .............. 386/69 |
| 6,850,386 B2 | * | 2/2005 | Kovinskaya et al. ..... 360/78.06 |
| 2004/0233569 A1 | | 11/2004 | Chung |

OTHER PUBLICATIONS

Samsung Products—Hard Disk Drive/White Papers, "Smart", pp. 1-3.
Samsung Products—Hard Disk Drive/White Papers, "Silent Seek", pp. 1-3.
Samsung Products—Hard Disk Drive/White Papers, "Noise Guard", pp. 1-3.

* cited by examiner

Primary Examiner—William R. Korzuch
Assistant Examiner—Jason Olson
(74) Attorney, Agent, or Firm—Foley & Lardner LLP (57) ABSTRACT

A disk drive includes a disk, a head, an actuator, and a servo controller. The servo controller controls a movement of the actuator based on a super silent seek profile to cause the actuator to perform a super silent seek in which an acoustic output due to the movement of the actuator is imperceptible to human listeners. A maximum jerk of the super silent seek profile may be less than a maximum jerk of a silent seek profile divided by ten. A snap associated with the super silent seek profile may be always less than a particular snap level, such that any change in the jerk associated with the super silent seek profile is gradual. The disk drive may further include a main controller that is configured to receive a command from an operating system, a user, and the like to perform a seek in a super silent seek mode.

38 Claims, 4 Drawing Sheets

DISK DRIVES AND METHODS ALLOWING FOR SUPER SILENT SEEKS

CROSS-REFERENCE TO RELATED PATENT APPLICATIONS

Embodiments of the present invention relate to U.S. Provisional Application Ser. No. 60/649,840, filed Feb. 3, 2005, entitled "Super Silent Seeks for Ancillary Disk Drive Operations", the contents of which are incorporated by reference herein and which is a basis for a claim of priority.

BACKGROUND OF THE INVENTION

1. Field of the Invention

Embodiments of the present invention relate generally to disk drives and methods and, in specific embodiments, to a disk drive including a servo controller for controlling a movement of an actuator based on a super silent seek profile to cause the actuator to perform a super silent seek in which an acoustic output due to the movement of the actuator is imperceptible to human listeners.

2. Related Art

Disk drives are widely used in computers and other electronic devices for the storage and retrieval of data. In the past, there has been a great focus on improving disk drive performance by minimizing seek time during reads and writes. As a result, seek operations have traditionally been performed as quickly as possible. More recently, there has been a recognition that when the mechanical components of a disk drive are moved as quickly as possible to minimize seek time, acoustic noise is generated that can be annoying and even worrisome to end users. Some attempts have been made in related art disk drives to reduce the amount of acoustic noise generated during seeks. However, in the related art disk drives, some amount of acoustic noise is still generated during seek operations that is perceptible and noticeable to human listeners, which has led to end user dissatisfaction with the disk drives.

In general, related art disk drives comprise one or more disks for storing data, an actuator, one or more transducers or heads, and a servo controller. Each head is operable to read data from and to write data to one or more tracks on a surface of a corresponding disk. The tracks are typically concentric circular tracks, but a disk may have a spiral track, such as is common for compact discs (CDs). The heads are connected to the actuator, and when a head performs a read or a write operation on a disk, the actuator is moved as part of a seek operation so that the head is positioned over a destination track. The movement of the actuator during a seek operation is controlled by the servo controller based in part on a seek profile that specifies how the actuator is to be moved during the seek operation.

In order to maximize disk drive performance, disk drive manufacturers have generally sought to minimize seek time by employing a seek profile known as a performance seek profile or a bang-bang seek profile. Such a performance seek profile is described in U.S. Pat. No. 4,937,689 entitled "Apparatus for Controlling Seek Strategy of Read/Write Head in a Disk Drive", the contents of which are incorporated by reference herein, and which is hereinafter referred to as reference 1. In FIG. 2 of reference 1, there is shown an example of a performance seek profile in which: (i) at time t0, a head is subjected to instantaneous maximum acceleration Am; (ii) the maximum acceleration is held until the head reaches a maximum velocity Vm at time tm; and (iii) the maximum velocity is held until time (tn-tm) at which time the head is subjected to maximum deceleration −Am so that the velocity linearly decreases to zero at time tn.

Such a performance seek profile has come to be known as a bang-bang seek profile, because the actuator first moves the head with maximum acceleration, and then later moves the head with maximum deceleration. By controlling the actuator to move the head with maximum acceleration and deceleration, noticeable levels of acoustic noise are generated due to vibration introduced to an actuator arm assembly on which the head is mounted as a result of the instantaneous acceleration and deceleration by the actuator. Performance seeks also have an issue with settling time, as they cause the actuator to decelerate fast, and there is no assurance that the head will settle in a stable manner over the destination track. In general, with performance seek profiles, there is very often an overshoot of the destination track, and time is required for recovery from the overshoot.

In order to reduce an amount of acoustic noise that is generated during seek operations, various related art disk drives have been designed to employ silent seek profiles or quiet seek profiles or low-noise seek profiles that result in less acoustic noise being generated than when performance seek profiles are employed for seek operations. Examples of related art disk drives that employ silent seek profiles are described in the following references: (i) reference 1; (ii) U.S. Pat. No. 6,624,964 entitled "Method and Apparatus for Reducing Seek Acoustics in Disk Drives for AV Systems", the contents of which are incorporated by reference herein, and which is hereinafter referred to as reference 2; and (iii) U.S. Pat. No. 6,396,653 entitled "Apparatus and Method for Reduction of Idle-Mode Acoustics in a Disc Drive", the contents of which are incorporated by reference herein, and which is hereinafter referred to as reference 3.

In reference 1, noise is reduced during seek operations in a disk drive by providing seek profiles that allow for controlling seek operations in which a head is gradually accelerated and then gradually decelerated to move the head from one track to another. The gradual acceleration/deceleration of the head, as performed in reference 1, was found to reduce noise and system wear as compared with the full-power and instantaneous acceleration/deceleration of a bang-bang seek profile.

However, in reference 1, the proposed seek profiles begin with an acceleration of 0, and then start acceleration in accordance with a linear function given by $A(tn)=Jt$, where J=the increase in acceleration per time sample, and t=the number of samples. Thus, the derivative of acceleration, which is known as jerk, immediately changes from a value of 0 to a fixed value of J at the beginning of seek operations, so the change in jerk is not smooth. The derivative of jerk is known as snap, and the value of snap when the jerk changes immediately from 0 to the fixed value J, is infinite. Also, in the seek profiles of reference 1, when the acceleration reaches a target acceleration after increasing according to a linear function, the acceleration becomes constant. Thus, the jerk changes immediately from the fixed value J to 0, and the absolute value of the snap at that time is again infinite. Therefore, while reference 1 is concerned with decreasing velocity and providing for gradual acceleration, reference 1 does not allow for placing a limit on snap, so a rate of change of jerk can be great.

In reference 2, there is noted a disadvantage of conventional disk drives in that the velocity profile of such conventional disk drives are designed to minimize access time for random seeks, which is particularly problematic when the disk drives are utilized for storage of Audio Visual/Video (AV) content in AV systems such as consumer electronics (e.g. Digital Video Recorders) in which access patterns require non-random seeks that generate significantly higher acoustic noise than random seeks. In order to reduce acoustic noise for seek operations, reference 2 discloses disk drives in which a seek profile for a seek operation depends on a seek length (i.e. distance between starting and destination tracks), and a current value and a target velocity can differ among seek profiles for different length seeks. However, similar to reference 1, while reference 2 focuses on reducing current and velocity, reference 2 does not disclose placing a limit on snap, so a rate of change of jerk can be great.

In reference 3, there is proposed a low-noise velocity profile that adjusts the acceleration, maximum velocity, and deceleration of an actuator to reduce the noise generated by the movement of the actuator during seeking. In the disk drives of reference 3, the low-noise velocity profile may be automatically used during idle periods for internal housekeeping operations of the disk drives, such as maintenance or self-diagnostic seeks, and may be automatically used for seek commands that come from a source other than a user, such as seek commands from a network. However, the disk drives of reference 3 only allow for an automatic use of the low-noise velocity profile, and do not allow for receiving a command from external sources to selectively enable and disable the use of the low-noise velocity profile. Also, the disk drives in reference 3 have no way to distinguish between seek operations initiated by an operating system and seek operations initiated by a user. Furthermore, the seek profiles disclosed in reference 3 allow for rapid changes in acceleration and, thus, both a jerk and a snap of the seek profiles may be great.

Even when employing the silent seek profiles or low-noise velocity profiles of the related art disk drives, a noticeable amount of noise is still produced during seek operations. For example, when silent seek profiles such as those described in the references are used for seek operations, there may be a level of noise generated during the seek operations that reaches more than 25 decibels (dB). Such an amount of generated noise may not be noticed by human listeners if there is some level of surrounding ambient noise, but the human ear can hear sound at levels as low as 18 dB, so such generated noise during seek operations may be perceived and noticed when there is a low level of surrounding ambient noise.

For example, if a user of a computer with a disk drive leaves the computer on in a room where the user is trying to sleep, there may be very low ambient noise in the room. Then, if the disk drive begins performing internal housekeeping operations, such as maintenance or self-diagnostic seeks, while the user is trying to sleep, the user may be very sensitive to any perceptible, extraneous, and uncontrolled noise and, thus, may be very annoyed that the disk drive is generating a noticeable amount of acoustic noise. Similarly, if a user in a quiet office is trying to concentrate or meditate, and is in deep thought, the user may become frustrated if a disk drive begins generating acoustic noise that is noticeable and interrupts the user's thought process. Also, there is a similar problem with audio CD systems, where changing a current audio piece causes audible noise when the CD head, which may be a mirror, is suddenly repositioned.

Moreover, if a user notices acoustic noise from a disk drive when the user has not performed an operation involving the disk drive, such as when the disk drive performs self-initiated internal housekeeping operations, the user may become worried and think that the disk drive has failed. Such worry or concern may be for no good reason, and may eventually lead the user to wrongly believe that the disk drive is defective and to return the disk drive. Thus, perceptible noise during seek operations may lead end users to lose confidence in the reliability and general health of their disk drives.

The disk drives of the related art continue to generate perceptible noise even when employing silent seek profiles, because such silent seek profiles focus on reducing velocity and adjusting acceleration, without focusing on reducing jerk and snap. A significant part of noise production in disk drives can be attributed to percussions that are due to rapid changes in jerk during a movement of an actuator. Even though the related art disk drives allow for adjusting acceleration for silent seek profiles, the related art disk drives do not impose a limit on a maximum amount of snap during seek operations, and, thus, do not ensure that the jerk during seek operations is smooth with no rapid changes. Jerks cause a percussion effect that can be perceived, especially in a quiet environment, while the movement of the actuator arm over the disk causes windage. Thus, the related art disk drives have not adequately addressed the contribution of jerk and snap to the acoustic noise that is generated during seek operations. The rotation of the disk also creates noise due to windage, which further contributes to the overall noise level produced by the disk drive.

Furthermore, in the related art disk drives, there is no way for a user or an operating system to issue a command to a disk drive to specify whether the disk drive should perform seek operations in accordance with a performance seek profile or a silent seek profile. Instead, in the related art disk drives, the use of the silent seek profile is automatic in various situations, such as for seek operations with a short seek length, for internal housekeeping operations, and for seek commands issued from specific sources. Thus, in the related art disk drives, there has not been an opportunity for a user or an operating system to specify whether a particular seek operation is to be performed with a performance seek profile or with a silent seek profile. Also, the related art disk drives do not allow for a user or an operating system to issue a command to select from among different types of seek profiles for particular seek operations, where each profile provides a different tradeoff between a speed of the seek operations and an acoustic output of the seek operations. While related art disk drives do provide a general setting to have all seeks done with a particular seek profile, such a general setting is not fine enough to be acceptable, especially because it takes a fair amount of time to come out of a silent seek mode in the related art disk drives where a silent seek profile is used for all seeks.

In light of the above mentioned problems, there is a need for disk drives with seek profiles that allow for reducing the amount of acoustic noise generated during seek operations, so that the acoustic noise generated during seek operations is not perceptible to human listeners. Also, there is a need for allowing disk drives to receive commands from users, operating systems, and the like that allow for selecting from among different modes for performing particular seek operations in which different seek profiles are employed.

SUMMARY OF THE DISCLOSURE

Embodiments of the present invention relate to disk drives and methods that allow for super silent seek operations in which an acoustic output during the super silent seek operations is imperceptible to human listeners. In various embodiments, such super silent seek operations may be used for ancillary disk drive operations, such as internal housekeeping operations, operating system background operations, and the like, to make the ancillary operations of the disk drive unnoticeable to end users. By making the acoustic noise during super silent seeks imperceptible to human listeners, the level of annoyance and worry by end users may be decreased, the level of end user confidence and satisfaction in the disk drives may be increased and, thus, the rate of return of disk drives that are wrongly believed to be defective may be decreased.

A disk drive according to a general embodiment of the present invention includes a disk, a head, an actuator, and a servo controller. The disk has a surface provided with one or more tracks for storing data. The head allows for reading data from the disk, and the actuator allows for positioning the head over the disk. The servo controller allows for controlling a movement of the actuator based on a super silent seek profile to cause the actuator to perform a super silent seek in which an acoustic output due to the movement of the actuator is imperceptible to human listeners.

In various embodiments, a level of acoustic output due to the movement of the actuator during a super silent seek is less than 18 dB. In further embodiments, a level of total acoustic output from the disk drive during the super silent seek is less than 18 dB. In various embodiments, the head comprises a read element for reading data from the disk and a write element for writing data to the disk. In some embodiments, the servo controller is configured to cause the actuator to be accelerated and decelerated in accordance with a super silent seek profile. Also, in some embodiments, a super silent seek profile specifies target velocity values used for a super silent seek.

In various embodiments, a maximum jerk of a super silent seek profile is less than a maximum jerk of a silent seek profile. For example, the maximum jerk of a super silent seek profile may be less than the maximum jerk of a silent seek profile divided by ten. In some embodiments, a snap of a super silent seek profile is always less than a particular snap value, such that any change in the jerk associated with the super silent seek profile is gradual. Also, in some embodiments, a maximum snap of a super silent seek profile is less than a maximum snap of a silent seek profile.

In various embodiments, the disk drive further comprises a main controller for controlling an operation of the servo controller. In some embodiments, the main controller is configured to control the operation of the servo controller such that the servo controller operates in a super silent seek mode during ancillary operations, and the servo controller is configured to control, in the event that the servo controller operates in the super silent seek mode, the movement of the actuator based on a super silent seek profile. In various embodiments, the ancillary operations may include internal housekeeping operations such as SMART (Self-Monitoring Analysis and Reporting Technology) operations, patrol seek, off-line sector reallocation, and the like. Also, in various embodiments, the ancillary operations may include operating system background operations such as rearranging files, file checking, file fixing, defragmentation, and the like.

In some embodiments, the main controller is configured to control the operation of the servo controller such that the servo controller operates in a super silent seek mode for performing seeks related to internal commands generated by the main controller once a predefined idle time period has elapsed in which no external commands have been received by the main controller. Also, in some embodiments, the main controller is configured to control the operation of the servo controller such that the servo controller operates in a super silent seek mode for performing seeks related to internal commands generated by the main controller once a predefined idle time period has elapsed in which no user initiated commands have been received by the main controller.

In various embodiments, the main controller is configured to receive a command to perform a seek in a super silent seek mode. In some embodiments, the main controller is configured to receive the command to perform the seek in the super silent seek mode as a command initiated by an operating system. Also, in some embodiments, the main controller is configured to receive the command to perform the seek in the super silent seek mode as a command initiated by a user.

In various embodiments, the main controller is configured to control the operation of the servo controller such that the servo controller operates in one of a performance seek mode, a silent seek mode, and a super silent seek mode. In the event that the servo controller operates in the performance seek mode, the servo controller may be configured to control the movement of the actuator based on a performance seek profile. In the event that the servo controller operates in the silent seek mode, the servo controller may be configured to control the movement of the actuator based on a silent seek profile. In the event that the servo controller operates in the super silent seek mode, the servo controller may be configured to control the movement of the actuator based on a super silent seek profile. In some embodiments, the main controller is configured to receive a command that specifies in which one of the performance seek mode, the silent seek mode, and the super silent seek mode the main controller should cause the servo controller to operate.

A method for performing a super silent seek in a disk drive in accordance with an embodiment of the present invention allows for controlling, by a servo controller, a movement of an actuator based on a super silent seek profile such that the actuator performs a super silent seek in which an acoustic output due to the movement of the actuator is imperceptible to human listeners.

Therefore, embodiments of the present invention allow for performing a super silent seek in which an acoustic output due to a movement of an actuator is imperceptible to human listeners. Also, embodiments of the present invention allow for an operating system, a user, and the like to issue a command to a disk drive to specify whether the disk drive should perform a seek according to a super silent seek profile. As a result, such embodiments may increase user satisfaction with disk drives by, for example, performing ancillary operations with super silent seeks so that the ancillary operations are not noticeable to an attentive listener. Furthermore, by performing seek operations that generate an acoustic output that is imperceptible to human listeners, the level of annoyance and worry by end users may be decreased, the level of end user confidence and satisfaction in the disk drives may be increased and, thus, the rate of return of disk drives that are wrongly believed to be defective may be decreased.

DETAILED DESCRIPTION OF PREFERRED EMBODIMENTS

Figure 1:
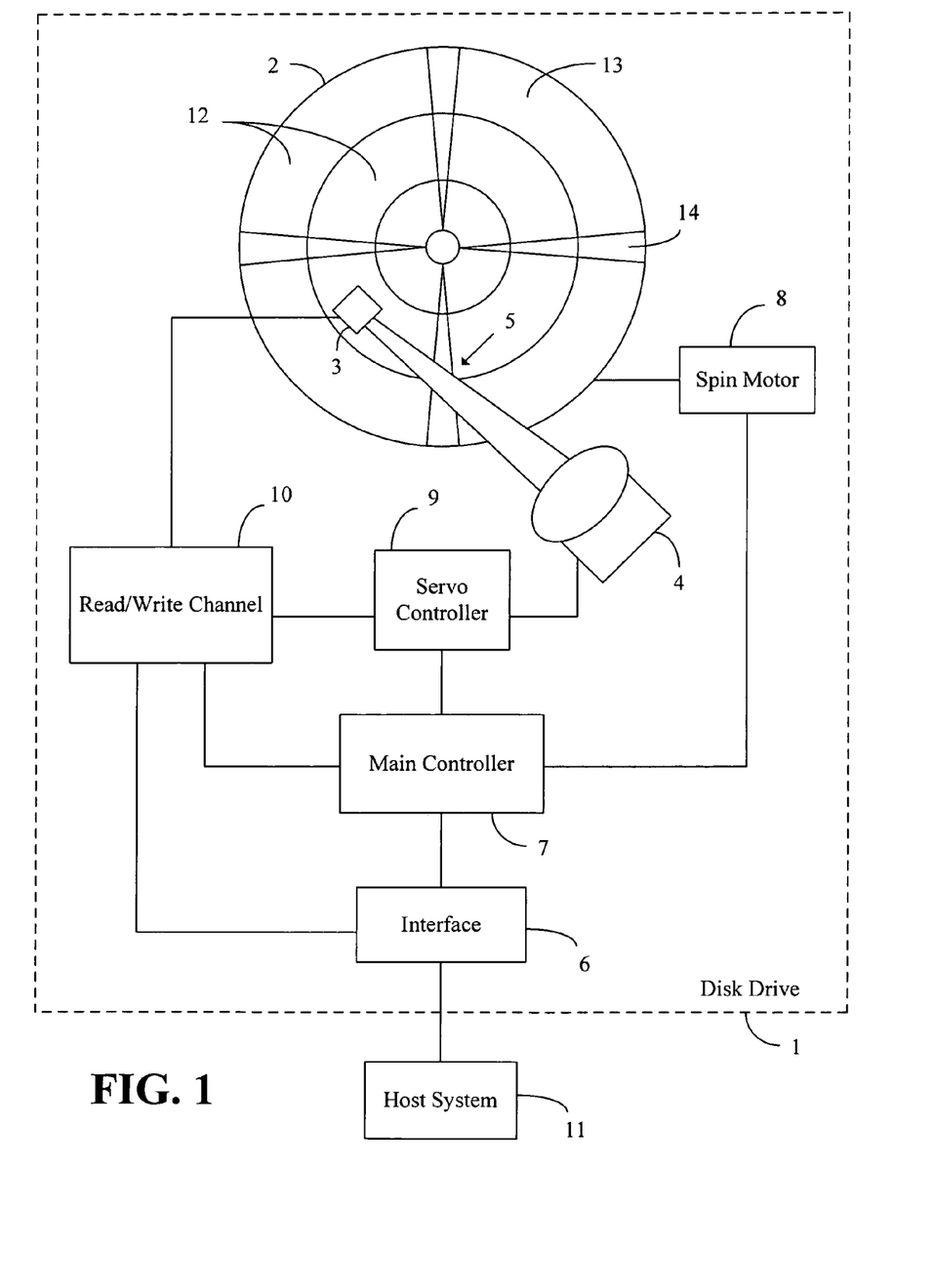
FIG. 1 illustrates a functional block diagram of a disk drive of an embodiment of the present invention.

FIG. 1 illustrates a functional block diagram of a disk drive 1 of an embodiment of the present invention. The disk drive 1 comprises a disk 2, a transducer or head 3, an actuator 4, an actuator arm assembly 5, an interface 6, a main controller 7, a spin motor 8, a servo controller 9, and a read/write (r/w) channel 10. The actuator 4 may comprise a voice coil motor (VCM) and the like. The head 3 is supported on the actuator arm assembly 5. During operation, the disk 2 spins around a central axis, and the head 3 reads data from or writes data to a surface of the disk 2. The actuator 4 rotates the actuator arm assembly 5 about an axis in order to control a position of the head 3 over the disk 2.

The disk drive 1 is not limited to having only a single disk 2, but may have a plurality of disks. Also, data may be written to both a top surface and a bottom surface of each disk, in which case a different head is required for each surface. The head 3 may have a single element for performing both reading and writing, or the head 3 may have separate elements for performing each of those operations, in which case the head 3 would comprise a read element and a write element. In such a case, the read element and the write element of the head 3 may be physically separated from each other. In addition, a microactuator may be included near an end of the actuator arm assembly 5 for performing fine positioning of the head 3.

In the following discussion, the disk drive 1 is described with reference to functional blocks and not discrete hardware elements. The functions may be implemented using one or more of hardware, software, and firmware. In addition, more than one function, or different parts of functions, may be combined in a given hardware, software, or firmware implementation.

When the disk drive 1 is connected to a host system 11, the interface 6 communicates with the host system 11 to receive, for example, data and commands, and to send, for example, data and status identifiers. The interface 6 also communicates with the main controller 7 and the r/w channel 10 to send and receive, for example, data and commands. When the main controller 7 receives, for example, a command from the interface 6 for a read or a write operation, the main controller 7 provides a signal to the spin motor 8 to cause the disk 2 to spin.

As shown in FIG. 1, the disk 2 has a plurality of tracks 12 for storing data. Each of the tracks 12 has a plurality of data sectors 13 and a plurality of embedded servo sectors 14. During operation of the disk drive 1, a data block may be read from or written to a data sector of the plurality of data sectors 13. The plurality of embedded servo sectors 14 are written with servo patterns that are used for determining a position of the head 3 with respect to a track of the plurality of tracks 12. In various other embodiments, the disk 2 may have a spiral track, such as is common for compact discs (CDs).

When performing a seek operation, the main controller 7 sends a signal that contains information about a selected track to the servo controller 9. The servo controller 9 then provides a positioning signal to the actuator 4 based on a seek profile, and the actuator 4 rotates the actuator arm assembly 5 according to the positioning signal in order to position the head 3 over the selected track. During the seek operation, the head 3 reads data from embedded servo sectors on the disk 2, and provides the data read from the embedded servo sectors as servo information to the r/w channel 10, and the r/w channel 10 then provides the servo information to the servo controller 9. The servo controller 9 uses the servo information as feedback to further adjust the positioning signal to control the actuator 4. Thus, as a result of the seek operation, the head 3 is positioned toward a center of the selected track.

When the servo controller 9 determines that the head 3 is positioned over the selected track, the servo controller 9 may send a signal to the r/w channel 10 to allow for the start of a read or a write operation. The servo controller 9 may also send the signal to the main controller 7 rather than to the r/w channel 10, in which case the main controller 7 would then send the signal to the r/w channel 10. The r/w channel 10 also receives a command from the main controller 7 that specifies the type of operation to be performed. In the case of a read operation, the r/w channel 10 causes the head 3 to read the data and then sends the data to either the interface 6 or the main controller 7. In the case of a write operation, the r/w channel 10 receives data from either the interface 6 or the main controller 7 and causes the head 3 to write the data.

Examples of performance seek profiles and silent seek profiles that may be employed by the servo controller 9 for controlling the movement of the actuator 4 during seek operations are shown in reference 1, reference 2, and reference 3. Further examples of silent seek profiles that may be employed by the servo controller 9 are discussed in the following two references: (i) U.S. Pat. No. 6,256,163 entitled "Method and Apparatus for Performing Current Shaping for Seeking Acoustics Reduction in a Disk Drive", the contents of which are incorporated by reference herein, and which is hereinafter referred to as reference 4; and (ii) U.S. Pat. No. 6,445,531 entitled "Disc Drive Method and Apparatus for Dynamically Adjusting Seek Operations", the contents of which are incorporated by reference herein, and which is hereinafter referred to as reference 5.

In various embodiments, the seek profiles that are used by the servo controller 9 are specified by look-up values that are stored in a look-up table. The values in the look-up table may specify, for example, target acceleration values for the movement of the actuator 4 at predetermined times or locations during the seek operations, target velocity values for the actuator 4 at predetermined times or locations during the seek operations, current values that specify a current that is to be applied to the actuator 4 during the seek operations, and the like. In various embodiments, the seek profiles may be specified by mathematical equations that are used during seek operations to calculate, for example, a jerk, an acceleration, a velocity, a current, and the like, that are used by the servo controller 9 to control the movement of the actuator 4. In some embodiments, a seek profile that is used for a particular seek operation may depend on a length of the particular seek operation, where the length of the particular seek operation is the distance between a starting track and a destination track of the particular seek operation. Also, in various embodiments, a seek profile that is used for a particular seek operation may depend on the position on the disk of the starting track and the destination track of the seek operation.

The servo controller 9 may be configured to allow for performing seek operations in accordance with performance seek profiles. For example, the servo controller 9 may store values in a look-up table that specify a maximum instantaneous acceleration by which to cause the actuator 4 to accelerate during a seek operation, a maximum velocity to be reached by the actuator 4 during the seek operation, and a maximum instantaneous deceleration by which to cause the actuator 4 to decelerate during the seek operation. Such a performance seek profile may be used for performing seek operations as rapidly as possible to reduce seek time for time critical operations. However, seek operations that are performed with a performance seek profile will generate a level of acoustic noise that is perceptible to human listeners due to a vibration of the actuator arm assembly 5, and other factors, as a result of the rapid acceleration and deceleration by the actuator 4.

Also, the servo controller 9 may be configured to perform seek operations in accordance with silent seek profiles. In various embodiments, the silent seek profiles may specify, for example, a reduced velocity or a reduced acceleration of the actuator 4 during seek operations with respect to a performance seek profile. Also, in various embodiments, the silent seek profiles may specify a gradual acceleration and deceleration of the actuator 4 during seek operations rather than an instantaneous acceleration and deceleration of the actuator 4. However, the silent seek profiles have one or both of a high level of jerk and a high level of snap, where jerk is the derivative of acceleration and snap is the derivative of jerk. Thus, seek operations that are performed in accordance with silent seek profiles will result in a perceptible and noticeable amount of acoustic noise to human listeners due to a percussive movement of the actuator 4 with one or both of high jerk and high snap.

For example, a silent seek profile may be designed for Audio Visual/Video (AV) operations to reduce a target velocity for non-random seek operations as compared to a target velocity for a performance seek profile, without placing a limit on jerk or snap. Silent seeks that are performed in accordance with silent seek profiles may reduce the amount of noise and energy generated during seek operations as compared to performance seeks that are performed in accordance with performance seek profiles. However, despite their name, silent seeks that are performed in accordance with silent seek profiles still generate some amount of acoustic noise that is noticeable and perceptible to human listeners. Examples of silent seek profiles are disclosed in references 1-5.

The servo controller 9 is further configured to perform seek operations in accordance with super silent seek profiles. The servo controller 9 may be configured to control a movement of the actuator 4 based on a super silent seek profile to cause the actuator 4 to perform a super silent seek in which an acoustic output due to the movement of the actuator 4 is imperceptible to human listeners. On average, human listeners can hear sounds at levels as low as 18 dB. Thus, a level of acoustic output due to a movement of the actuator 4 during a super silent seek is less than 18 dB. Also, a total level of acoustic output from the disk drive 1 during a super silent seek, including acoustic noise due to the rotation of the disk 2, is preferably less than 18 dB, but does not have to be less than 18 dB.

Super silent seek profiles differ from silent seek profiles in that super silent seek profiles impose a limit on one or both of jerk and snap, such that an acoustic output due to a movement of the actuator 4 during a super silent seek is imperceptible to an average human listener. For example, a maximum jerk of a super silent seek profile may be less than a maximum jerk of a silent seek profile divided by ten. Also, for example, a snap associated with a super silent seek profile may always be less than a particular snap level, such that any change in a jerk associated with the super silent seek profile is gradual. The maximum level of jerk and the maximum level of snap for super silent seek profiles may vary among disk drives, and may be determined experimentally for different types of disk drives to ensure that an acoustic output during the super silent seeks is imperceptible to human listeners.

Figure 2:
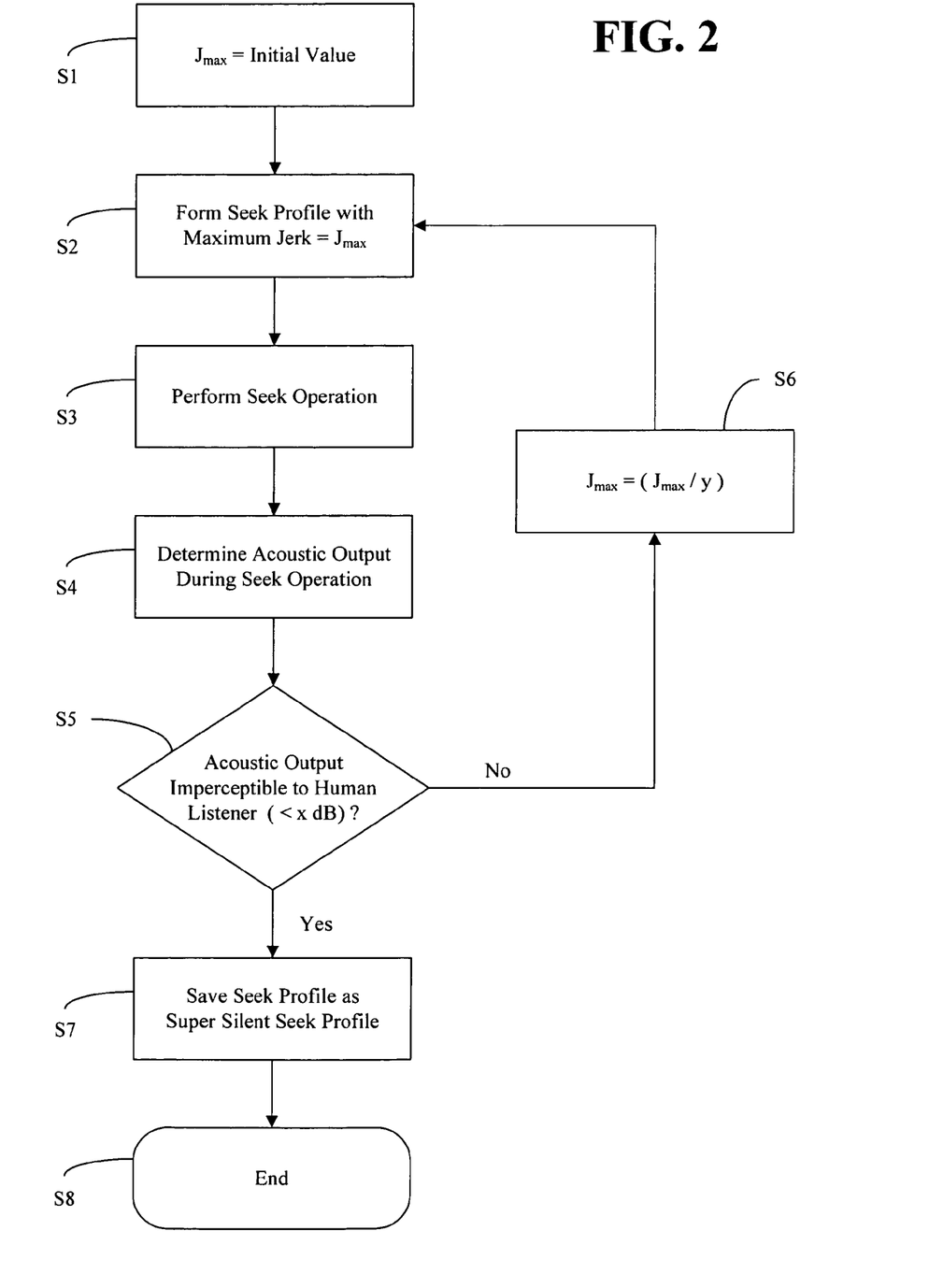
FIG. 2 is a flowchart illustrating an example process for forming a super silent seek profile by imposing a limit on a maximum level of jerk in accordance with an embodiment of the present invention.

FIG. 2 is a flowchart illustrating an example process for forming a super silent seek profile by imposing a limit on a maximum level of jerk. Jerk is the derivative of acceleration. The process in FIG. 2 requires performing experiments with a particular disk drive, and the experiments may be conducted, for example, with a computer running test software that is in communication with the particular disk drive. In S1, $J_{max}$ is set to an initial value, where $J_{max}$ is a variable specifying a maximum level of jerk. The initial value may be set to any value, and may be set, for example, to be a maximum level of jerk of a known silent seek profile. The process then continues to S2. In S2, a seek profile is formed with a maximum jerk equal to $J_{max}$. Such a seek profile may, for example, be constructed by a technician and input into the particular disk drive, or may be determined from pre-programmed equations, or may be determined by other methods for constructing seek profiles. The process then continues to S3.

In S3, the particular disk drive is caused to perform a seek operation using the seek profile, and the process continues to S4. In S4, an acoustic output is determined during the seek operation by any known method for detecting an acoustic level, and the process continues to S5. In S5, it is determined whether the acoustic output during the seek operation was imperceptible to an average human listener by determining, for example, whether the level of acoustic output was less than x db, where x may be around 18 dB.

If it is determined in S5 that the acoustic output during the seek operation was not imperceptible to an average human listener (i.e. an average human listener could perceive the acoustic output), then the process continues to S6. In S6, $J_{max}$ is set to $J_{max}$ divided by "y", where "y" is a variable that can be set to a desired value greater than 1 for dividing the maximum jerk, and the process then returns to S2 where a different seek profile is formed with the reduced maximum jerk.

On the other hand, if it is determined in S5 that the acoustic output during the seek operation was imperceptible to an average human listener, then the process continues to S7 where the seek profile is saved as a super silent seek profile, and then the process ends in S8. Thus, in accordance with the process shown in FIG. 2, a super silent seek profile for a particular disk drive that allows for performing a seek operation with an acoustic output that is imperceptible to an average human listener can be determined experimentally by continually reducing a maximum level of jerk associated with a seek profile until a desired acoustic output is obtained.

Figure 3:
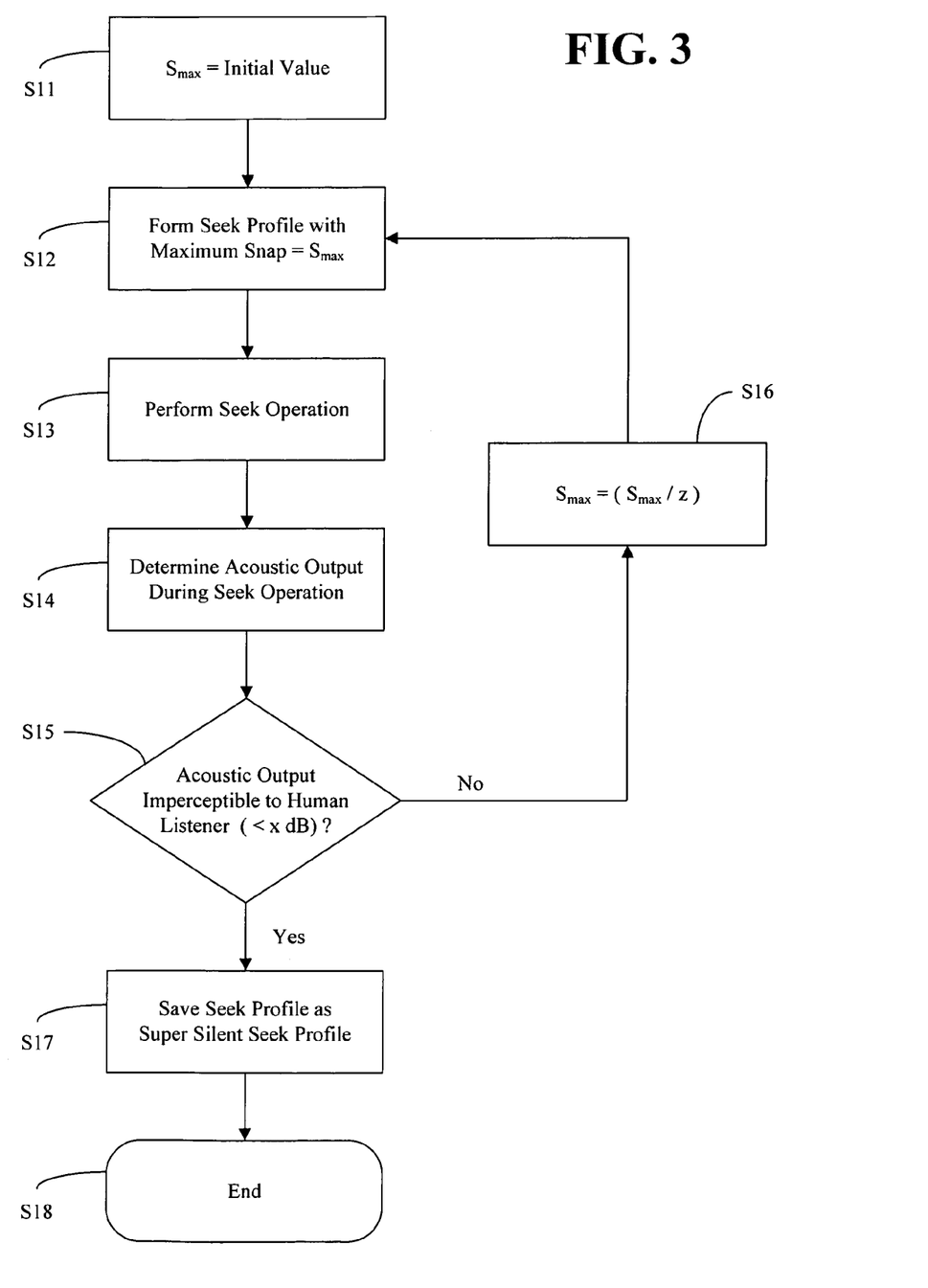
FIG. 3 is a flowchart illustrating an example process for forming a super silent seek profile by imposing a limit on a maximum level of snap in accordance with an embodiment of the present invention.

FIG. 3 is a flowchart illustrating an example process for forming a super silent seek profile by imposing a limit on a maximum level of snap. Snap is the derivative of jerk, and snap is also known as jounce. Similar to the process of FIG. 2, the process in FIG. 3 requires performing experiments with a particular disk drive, and the experiments may be conducted, for example, with a computer running test software that is in communication with the particular disk drive. In S11, $S_{max}$ is set to an initial value, where $S_{max}$ is a variable specifying a maximum level of snap. The initial value may be set to any value. The process then continues to S12. In S12, a seek profile is formed with a maximum snap equal to $S_{max}$. Such a seek profile may, for example, be constructed by a technician and input into the particular disk drive, or may be determined from preprogrammed equations, or may be determined by other methods for constructing seek profiles. The process then continues to S13.

In S13, the particular disk drive is caused to perform a seek operation using the seek profile, and the process continues to S14. In S14, an acoustic output is determined during the seek operation by any known method for detecting an acoustic level, and the process continues to S15. In S15, it is determined whether the acoustic output during the seek operation was imperceptible to an average human listener by determining, for example, whether the level of acoustic output was less than x db, where x may be around 18 dB.

If it is determined in S15 that the acoustic output during the seek operation was not imperceptible to an average human listener (i.e. an average human listener could perceive the acoustic output), then the process continues to S16. In S16, $S_{max}$ is set to $S_{max}$ divided by "z", where "z" is a variable that can be set to a desired value greater than 1 for dividing the maximum snap, and the process then returns to S12 where a different seek profile is formed with the reduced maximum snap.

On the other hand, if it is determined in S15 that the acoustic output during the seek operation was imperceptible to an average human listener, then the process continues to S17 where the seek profile is saved as a super silent seek profile, and then the process ends in S18. Thus, in accordance with the process shown in FIG. 3, a super silent seek profile for a particular disk drive that allows for performing a seek operation with an acoustic output that is imperceptible to an average human listener can be determined experimentally by continually reducing a maximum level of snap associated with a seek profile until a desired acoustic output is obtained. Once super silent seek profiles are determined for a particular disk drive, the same super silent seek profiles may be used for other disk drives of the same or similar type, so that a super silent seek profile does not have to be determined for each disk drive individually.

The main controller 7 may be configured to cause the servo controller 9 to control seek operations in accordance with a super silent seek profile when the seek operations are for ancillary operations. Ancillary operations may include internal housekeeping operations of the disk drive 1, such as SMART (Self-Monitoring Analysis and Reporting Technology) operations, patrol seek, off-line sector reallocation, and the like. SMART operations may be used to check internal components of the disk drive 1 such as the disk 2, the head 3, the actuator 4, the spin motor 8, and the like, to make sure that they are operating properly, and to provide a warning message in case of a detected error. SMART operations may also be used to check for data errors on the disk 2, and to attempt to fix the data errors. Patrol seek may be used to remove an accumulation of grease or lubricant on the disk 2 by moving the head 3.

The ancillary operations may also include operating system background operations such as rearranging files, file checking, file fixing, defragmentation, and the like. In some embodiments, the main controller 7 may be configured to receive a command from an operating system to specify that a particular operation is an operating system background operation. In various embodiments, seek operations for any ancillary operation that does not require a prompt response time (non time-critical) would be performed in accordance with a super silent seek profile. By performing seeks for ancillary operations as super silent seeks, the acoustic output due to the seek operations would be inaudible to even an attentive listener.

In various embodiments, the main controller 7 is configured to determine when a predefined idle time period has elapsed in which no external commands from external sources to the disk drive 1 have been received by the main controller 7. In such embodiments, the main controller 7 may be further configured to control an operation of the servo controller 9 such that the servo controller 9 operates in a super silent seek mode for performing seeks related to internal commands from the main controller 7 once the predefined idle time period has elapsed. The servo controller 9 may be configured to control the movement of the actuator 4 based on a super silent seek profile when the servo controller 9 operates in the super silent seek mode. Seek operations for any ancillary operations that are performed after the predefined idle time period has elapsed may then be performed as super silent seek operations. The predefined idle time period may be any period of time such as, for example, a few seconds, a few minutes, or the like.

The main controller 7 may be configured to receive a command from an external source, such as an operating system, a user, and the like, that specifies a type of seek profile to use for seek operations. For example, if the host system 11 is a computer with an operating system, the operating system may issue a command to the disk drive 1 to specify that seek operations should be performed as super silent seek operations. The command may be received by the interface 6 of the disk drive 1 and then sent to the main controller 7. In various embodiments, the command may specify a type of seek profile to be used for a specific seek operation. Also, in various embodiments, the command may specify that all seek operations performed after the issuance of the command should be performed in accordance with a specified seek profile until a further command specifying a different seek profile is issued.

Figure 4:
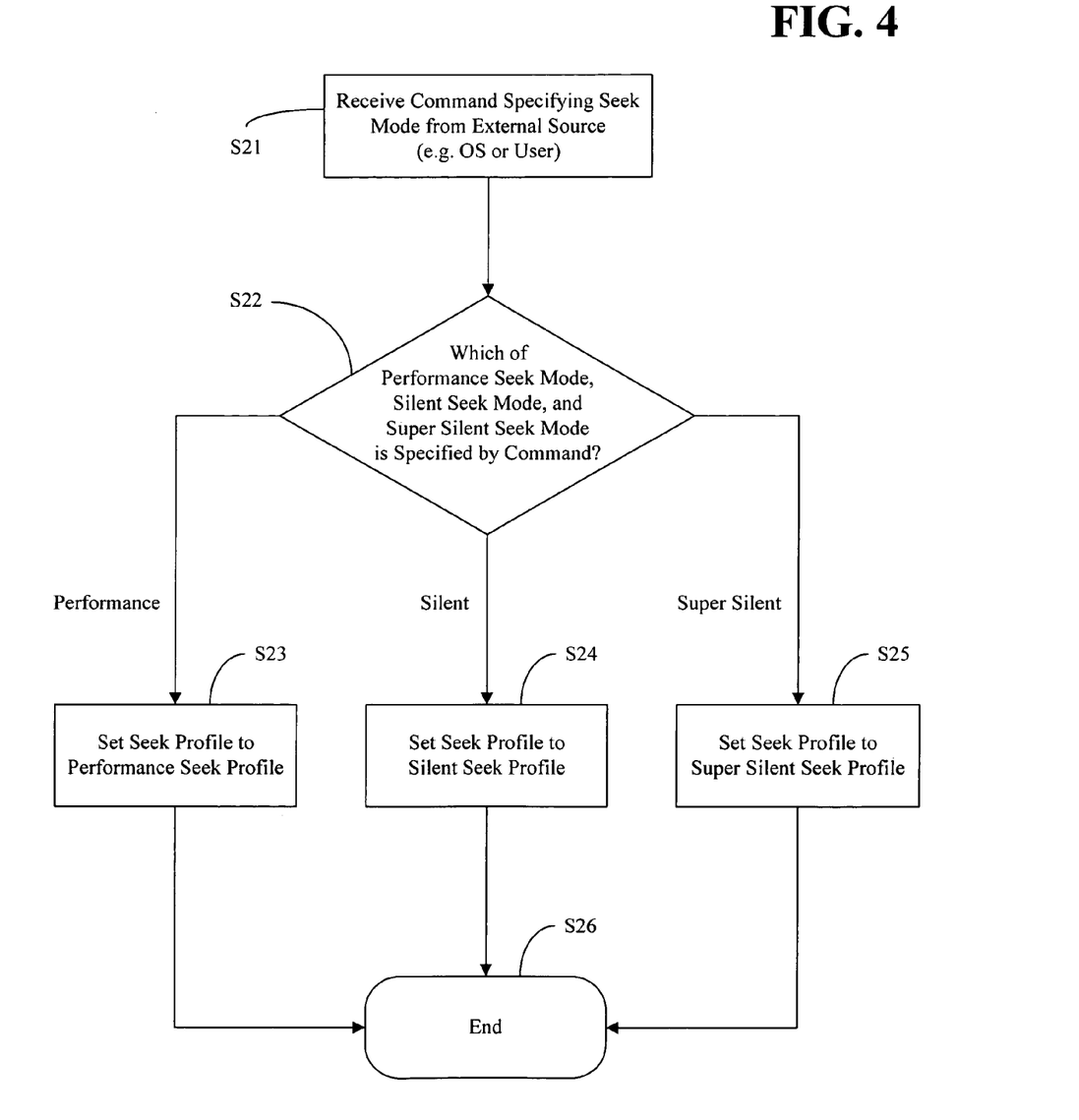
FIG. 4 is a flowchart illustrating an example process performed by a disk drive upon receiving a command from an external source for specifying a seek mode in accordance with an embodiment of the present invention.

FIG. 4 is a flowchart illustrating an example process performed by the disk drive 1 upon receiving a command from an external source for specifying a seek mode. The process in FIG. 4 may be performed by the main controller 7 of the disk drive 1. In S21, the main controller 7 receives a command specifying a seek mode from an external source, such as an operating system, a user, and the like. The process then continues to S22. In S22, the main controller 7 determines which of a performance seek mode, a silent seek mode, and a super silent seek mode is specified by the received command.

If it is determined in S22 that a performance seek mode is specified by the command, then the process continues to S23. In S23, the main controller 7 causes the servo controller 9 to control the actuator 4 to perform seek operations in accordance with performance seek profiles. The process then ends in S26. If it is determined in S22 that a silent seek mode is specified by the command, then the process continues to S24. In S24, the main controller 7 causes the servo controller 9 to control the actuator 4 to perform seek operations in accordance with silent seek profiles. The process then ends in S26.

Finally, if it is determined in S22 that a super silent seek mode is specified by the command, then the process continues to S25. In S25, the main controller 7 causes the servo controller 9 to control the actuator 4 to perform seek operations in accordance with super silent seek profiles. The process then ends in S26.

The main controller 7 may be configured to received different types of commands. For example, one type of command may specify that only a seek operation for an immediately following operation is to be performed in a particular seek mode, and another type of command may specify that all seek operations following the command are to be performed in the specified seek mode until the reception of a further command specifying a different seek mode.

In various embodiments, other ways of further reducing noise may be included in the disk drive 1, such as insulation around the components of the disk drive 1, fluid dynamic bearings for aiding rotation of the disk 2, and the like. Also, in various embodiments, the rotation speed of the disk 2 may be lowered in order to reduce an acoustic noise generated due to the rotation of the disk 2.

Therefore, embodiments of the present invention allow for a servo controller to control a movement of an actuator based on a super silent seek profile to cause the actuator to perform a super silent seek in which an acoustic output due to the movement of the actuator is imperceptible to human listeners. Also, such super silent seeks can be used for ancillary operations, which would prevent users from noticing the ancillary drive operations, and would lead users to maintain a high level of confidence in the disk drives. Such confidence in the general health of the disk drives may then lead to less disk drives being returned due to falsely held beliefs that the disk drives are defective.

Furthermore, embodiments of the present invention allow for a disk drive to receive a command from an external source, such as a user, an operating system, and the like, to specify a seek mode. Thus, a super silent seek mode may be specified by an operating system for performing operating system background operations using super silent seeks to further reduce the amount of acoustic noise noticed by users.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A disk drive, comprising:
a disk for storing data;
a head for reading data from the disk;
an actuator for positioning the head;
a first controller for controlling a movement of the actuator based on specific type of seek profile when operating in a specific seek mode to cause the actuator to perform a specific type of seek in which an acoustic output due to the movement of the actuator is less than 18 dB, the first controller having a plurality of available seek modes for carrying out each of one or more particular seek operations, the plurality of available seek modes including the specific seek mode; and
a second controller for controlling the first controller such that the first controller operates in the specific seek mode when at least one of (i) the one or more particular seek operations are performed for ancillary operations, where the ancillary operations include at least one of internal housekeeping operations and operating system background operations, (ii) the one or more particular seek operations are related to internal commands generated by the second controller, and (iii) the second controller receives a command that selects the specific seek mode from among the plurality of available seek modes for performing the one or more particular seek operations.

2. The disk drive of claim 1,
wherein a maximum jerk of the specific type of seek profile is less than a maximum jerk of a silent seek profile.

3. The disk drive of claim 2,
wherein the maximum jerk of the specific type of seek profile is less than the maximum jerk of the silent seek profile divided by ten.

4. The disk drive of claim 2,
wherein a maximum snap of the specific type of seek profile is less than a maximum snap of the silent seek profile.

5. The disk drive of claim 1,
wherein a snap associated with the specific type of seek profile is always less than a particular snap level, such that any change in a jerk associated with the specific type of seek profile is gradual.

6. The disk drive of claim 1,
the second controller for controlling the operation of the first controller such that the first controller operates in the specific seek mode when the one or more particular seek operations are performed for the ancillary operations.

7. The disk drive of claim 6,
wherein the ancillary operations include the internal housekeeping operations; and
wherein the internal housekeeping operations comprise at least one of self-monitoring analysis and reporting technology (SMART) operations, patrol seek, and off-line sector reallocation.

8. The disk drive of claim 6,
wherein the ancillary operations include the operating system background operations; and
wherein the operating system background operations comprise at least one of rearranging files, file checking, file fixing, and defragmentation.

9. The disk drive of claim 1,
the second controller for controlling the operation of the first controller such that the first controller operates in the specific seek mode for performing the one or more particular seek operations when the one or more particular seek operations are related to one or more internal commands generated by the second controller once a predefined idle time period has elapsed in which no external commands have been received by the second controller.

10. The disk drive of claim 1,
the second controller for controlling the operation of the first controller such that the first controller operates in the specific seek mode for performing the one or more particular seek operations when the one or more particular seek operations are related to one or more internal commands generated by the second controller once a predefined idle time period has elapsed in which no user initiated commands have been received by the second controller.

11. The disk drive of claim 1,
the second controller for controlling, in an event that the second controller receives the command that selects the specific seek mode from among the plurality of available seek modes for performing the one or more particular seek operations, the operation of the first controller such that the first controller controls the movement of the actuator based on the specific type of seek profile.

12. The disk drive of claim 11,
wherein the command that selects the specific seek mode from among the plurality of available seek modes for performing the one or more particular seek operations as is a command initiated by an operating system.

13. The disk drive of claim 11,
wherein the command that selects the specific seek mode from among the plurality of available seek modes for performing the one or more particular seek operations is a command initiated by a user.

14. The disk drive of claim 1,
the second controller for controlling the operation of the first controller such that the first controller operates in one of a performance seek mode, a silent seek mode, and the specific seek mode;
the first controller for controlling, in an event that the first controller operates in the performance seek mode, the movement of the actuator based on a performance seek profile; and
the first controller for controlling, in an event that the first controller operates in the silent seek mode, the movement of the actuator based on a silent seek profile.

15. The disk drive of claim 14,
the second controller for selectively controlling the first controller to operate in one of the performance seek mode, the silent seek mode, and the specific seek mode based on a received command that specifies in which one of the performance seek mode, the silent seek mode, and the specific seek mode the second controller should cause the first controller to operate.

16. A method in a disk drive, said disk drive having a disk for storing data, a head for reading data from the disk, an actuator for positioning the head, and a first controller, the method comprising:
determining at least one of (i) when the disk drive is performing ancillary operations, where the ancillary operations include at least one of internal housekeeping operations of the disk drive and operating system background operations, (ii) when a predefined idle time period has elapsed in which no external commands have been received by the disk drive, (iii) when a particular predefined idle time period has elapsed in which no user initiated commands have been received by the disk drive, and (iv) whether the disk drive has received a command that selects, from among a plurality of available seek modes in which the first controller is operable for performing a particular seek operation, a specific seek mode for performing the particular seek operation;
causing, in an event that it is determined that the disk drive is performing the ancillary operations, the first controller to operate in the specific seek mode;
causing, in an event that it is determined that the predefined idle time period has elapsed in which no external commands have been received by the disk drive, the first controller to operate in the specific seek mode for performing seeks related to internal commands generated by the disk drive;
causing, in an event that it is determined that the particular predefined idle time period has elapsed in which no user initiated commands have been received by the disk drive, the first controller to operate in the specific seek mode for performing seeks related to internal commands generated by the disk drive;
causing, in an event that it is determined that the disk drive has received the command that selects the specific seek mode from among the plurality of available seek modes for performing the particular seek operation, the first controller to operate in the specific seek mode; and
controlling, by the first controller in an event that the first controller is caused to operate in the specific seek mode, a movement of the actuator based on a specific the of seek profile such that the actuator performs a specific type of seek in which an acoustic output due to the movement of the actuator is less than 18 dB.

17. The method of claim 16,
wherein a maximum jerk of the specific type of seek profile is less than a maximum jerk of a silent seek profile.

18. The method of claim 17,
wherein the maximum jerk of the specific type of seek profile is less than the maximum jerk of the silent seek profile divided by ten.

19. The method of claim 16,
wherein a snap associated with the specific seek profile is always less than a particular snap level, such that any change in a jerk associated with the specific type of seek profile is gradual.

20. The method of claim 16,
wherein a maximum snap of the specific type of seek profile is less than a maximum snap of a silent seek profile.

21. The method of claim 16, wherein said determining comprises:
determining when the disk drive is performing the ancillary operations.

22. The method of claim 21,
wherein the ancillary operations include the internal housekeeping operations of the disk drive; and
wherein the internal housekeeping operations comprise at least one of self-monitoring analysis and reporting technology (SMART) operations, patrol seek, and off-line sector reallocation.

23. The method of claim 21,
wherein the ancillary operations include the operating system background operations; and
wherein the operating system background operations comprise at least one of rearranging files, file checking, file fixing, and defragmentation.

24. The method of claim 16, wherein said determining comprises:
determining when the predefined idle time period has elapsed in which no external commands have been received by the disk drive.

25. The method of claim 16, wherein said determining comprises:
determining when the particular predefined idle time period has elapsed in which no user initiated commands have been received by the disk drive.

26. The method of claim 16, wherein said determining comprises:
determining whether the disk drive has received the command that selects the specific seek mode from among the plurality of available seek modes for performing the particular seek operation.

27. The method of claim 26, further comprising:
receiving, by the disk drive, a particular command initiated by an operating system that selects the specific seek mode from among the plurality of available seek modes for performing one or more seek operations.

28. The method of claim 26, further comprising:
receiving, by the disk drive, a particular command initiated by a user that selects the specific seek mode from among the plurality of available seek modes for performing one or more seek operations.

29. An apparatus, comprising:
a disk drive; and
electronic circuitry for processing data received from the disk drive;
wherein the disk drive comprises:
a disk for storing data;
a head for reading data from the disk;
an actuator for positioning the head;
a first controller for controlling a movement of the actuator based on a specific type of seek profile when operating in a specific seek mode to cause the actuator to perform a specific type of seek in which an acoustic output due to the movement of the actuator is less than 18 dB; and
a second controller for receiving a command that selects a seek mode from among a plurality of available seek modes that are available for performing one or more particular seeks, and for controlling an operation of the first controller such that the first controller operates in the specific seek mode to perform the one or more particular seeks in an event that the seek mode selected by the command is the specific seek mode.

30. The apparatus of claim 29,
the second controller for receiving the command as a command initiated by an operating system.

31. The apparatus of claim 29,
the second controller for receiving the command as a command initiated by a user.

32. The apparatus of claim 29,
wherein the apparatus comprises at least one of a computer, an audio player, and a digital video recorder.

33. The apparatus of claim 29,
wherein a snap associated with the specific type of seek profile is always less than a particular snap level, such that any change in a jerk associated with the specific type of seek profile is gradual.

34. An apparatus, comprising:
an actuator; and
a first controller for controlling a movement of the actuator, the first controller controllable to operate in a plurality of different modes, the plurality of different modes including:
a performance seek mode for causing the first controller to control the actuator to perform a performance seek in which the actuator is approximately instantaneously accelerated with a particular acceleration and the particular acceleration is substantially maintained until the actuator is moving with a desired velocity;
a silent seek mode for causing the first controller to control the actuator to perform a silent seek in which the actuator is gradually accelerated until the actuator is moving with a particular desired velocity, and in which a certain acoustic output due to the movement of the actuator is greater than 18 dB; and
a specific seek mode for causing the first controller to control the actuator to perform a specific type of seek in which an acoustic output due to the movement of the actuator is less than 18 dB.

35. The apparatus of claim 34,
wherein a maximum jerk for the specific type of seek is less than a maximum jerk for the silent seek.

36. The apparatus of claim 35,
wherein the maximum jerk for the specific type of seek is less than the maximum jerk for the silent seek divided by ten.

37. The apparatus of claim 34,
wherein a maximum snap for the specific type of seek is less than a maximum snap for the silent seek.

38. The apparatus of claim 34,
wherein a snap for the specific type of seek is always less than a particular snap level such that any change in a jerk for the specific type of seek is gradual.

* * * * *

UNITED STATES PATENT AND TRADEMARK OFFICE
CERTIFICATE OF CORRECTION

PATENT NO. : 7,289,291 B1
APPLICATION NO. : 11/196061
DATED : October 30, 2007
INVENTOR(S) : Maurice Schlumberger It is certified that error appears in the above-identified patent and that said Letters Patent is hereby corrected as shown below:

Claim 12, column 15, line 8: the text "as is a command initiated" should read -- is a command initiated --.

Claim 16, column 16, line 9: the text "the of seek profile such that" should read -- type of seek profile such that --.

Claim 19, column 16, line 21: the text "associated with the specific seek profile" should read -- associated with the specific type of seek profile --.

Signed and Sealed this

First Day of April, 2008

JON W. DUDAS
*Director of the United States Patent and Trademark Office*